(12) United States Patent
Xia et al.

(10) Patent No.: US 9,856,702 B2
(45) Date of Patent: Jan. 2, 2018

(54) CUTTING ELEMENT FOR A DOWNHOLE TOOL

(71) Applicant: SMITH INTERNATIONAL, INC., Houston, TX (US)

(72) Inventors: Sike Xia, Pearland, TX (US); Xin Deng, Spring, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 531 days.

(21) Appl. No.: 14/487,942

(22) Filed: Sep. 16, 2014

(65) Prior Publication Data

US 2015/0075878 A1 Mar. 19, 2015

Related U.S. Application Data

(60) Provisional application No. 61/879,555, filed on Sep. 18, 2013.

(51) Int. Cl.

| | |
|---|---|
| *B24D 3/00* | (2006.01) |
| *B24D 11/00* | (2006.01) |
| *B24D 18/00* | (2006.01) |
| *B24D 3/02* | (2006.01) |
| *C09K 3/14* | (2006.01) |
| *E21B 10/567* | (2006.01) |
| *B24D 3/06* | (2006.01) |

(Continued)

(52) U.S. Cl.
CPC .............. *E21B 10/567* (2013.01); *B24D 3/06* (2013.01); *C04B 35/5607* (2013.01); *C04B 35/5611* (2013.01); *C04B 35/5626* (2013.01); *C22C 26/00* (2013.01); *C22C 29/06* (2013.01); *B22F 2005/001* (2013.01); *C04B 2235/5292* (2013.01); *C04B 2235/785* (2013.01); *C04B 2235/786* (2013.01); *C04B 2235/80* (2013.01); *C04B 2235/96* (2013.01); *C22C 2026/006* (2013.01)

(58) Field of Classification Search
USPC .......................................... 51/307, 293, 309
See application file for complete search history.

(56) References Cited

U.S. PATENT DOCUMENTS

| | | |
|---|---|---|
| 4,515,226 A | 5/1985 | Mengel et al. |
| 6,612,383 B2 | 9/2003 | Desai et al. |

(Continued)

FOREIGN PATENT DOCUMENTS

| | | |
|---|---|---|
| EP | 1218556 B1 | 3/2002 |
| EP | 123288 A1 | 8/2002 |
| EP | 2176499 B1 | 12/2011 |

*Primary Examiner* — James McDonough (57) ABSTRACT

A cutting element for a cutting tool. The cutting element may be at least partially made from a composite material including a carbide material, a binder material, and a plurality of diamond particles. The carbide material may be from 55 wt % to 97 wt % of a total weight of the composite material. The binder material may be from 3 wt % to 20 wt % of the total weight of the composite material. The plurality of diamond particles may be from 0.1% to 25% of the total weight of the composite material. The carbide material and the binder material may be combined and sintered together prior to being combined with the plurality of diamond particles, such that the carbide material and the binder material form a plurality of pellets having an average cross-sectional length from 10 μm to 250 μm.

18 Claims, 4 Drawing Sheets

(51) Int. Cl.
*C04B 35/56* (2006.01)
*C22C 26/00* (2006.01)
*C22C 29/06* (2006.01)
*B22F 5/00* (2006.01)

(56) References Cited

U.S. PATENT DOCUMENTS

| | | | |
|---|---|---|---|
| 7,211,218 B2 | 5/2007 | Fang et al | |
| 7,350,599 B2 | 4/2008 | Lockwood et al. | |
| 7,350,955 B2 * | 4/2008 | Chang | G02F 1/133603 |
| | | | 349/68 |
| 8,006,781 B2 | 8/2011 | Hunt et al. | |
| 8,267,204 B2 | 9/2012 | Lyons | |
| 8,397,841 B1 | 3/2013 | Griffo et al. | |
| 2010/0243336 A1 | 9/2010 | Dourfaye et al. | |
| 2012/0005966 A1 | 1/2012 | Cleboski et al. | |
| 2012/0152622 A1 * | 6/2012 | Sue | E21B 10/567 |
| | | | 175/428 |
| 2012/0247840 A1 | 10/2012 | Vempati et al. | |

* cited by examiner

CUTTING ELEMENT FOR A DOWNHOLE TOOL

CROSS-REFERENCE TO RELATED APPLICATIONS

This application claims the benefit of, and priority to, U.S. patent application Ser. No. 61/879,555 filed on Sep. 18, 2013 and titled "CUTTING ELEMENT FOR A DOWNHOLE TOOL," which application is expressly incorporated herein by this reference.

BACKGROUND

A wellbore may be formed within a rock formation to facilitate the extraction of natural resources (e.g., natural gas, crude oil, water, etc.) or for a variety of other purposes. In some cases, a wellbore may have a casing secured therein. The casing may isolate the wellbore from the surrounding rock formation, as well as provide structural integrity to the wellbore. In some cases, the casing may have a window milled therein. Such a window may be used for directional drilling operations. A section of the casing may also be milled away during an abandonment process within the wellbore.

SUMMARY

A cutting element is disclosed in accordance with some embodiments of the present disclosure. The cutting element may be at least partially made from a composite material including a carbide material, a binder material, and diamond particles. The carbide material may be from 55 wt % to 97 wt % of a total weight of the composite material. The binder material may be from 3 wt % to 20 wt % of the total weight of the composite material. The diamond particles may be from 0.1 wt % to 25 wt % of the total weight of the composite material. The carbide material and the binder material may be combined and sintered together prior to being combined with the diamond particles, and the carbide and binder materials may form pellets having an average cross-sectional length between 10 µm and 250 µm.

In another embodiment, a cutting element for a downhole tool may be at least partially made from a composite material including pellets in a diamond network. The composite material may include a carbide material, a binder material, and diamond particles. Between 55 wt % and 97 wt % of a total weight of the composite material may be made up of the carbide material. The carbide material may include at least one of tungsten carbide, titanium carbide, niobium carbide, or tantalum carbide. Between 3 wt % and 20 wt % of the total weight of the composite material may be made up of the binder material. The binder material may include any combination of cobalt, nickel, iron, or other binders. The diamond particles of the diamond network may make up between 0.1 wt % and 25 wt % of the total weight of the composite material. The diamond particles may have an average cross-sectional length from 2 µm to 30 µm. The pellets may be formed by combining and sintering the carbide material and the binder material prior to being combined with the diamond particles, and may have an average cross-sectional length between 10 µm and 250 µm.

A method for making a cutting insert is also disclosed in accordance with some embodiments of the present disclosure. The method may include sintering a carbide material and a binder material together to form pellets having an average cross-sectional length from 10 µm to 250 µm. The pellets may have a generally spherical, angled, or other shape. The pellets, diamond particles, and optionally a pre-mixed metal binder, may be sintered together to form a composite material. The carbide material may form 55 wt % to 97 wt % of a total weight of the composite material. The binder material may form 3 wt % to 20 wt % of the total weight of the composite material. The diamond particles may form 0.1 wt % to 25 wt % of the total weight of the composite material.

This summary is provided to introduce a selection of concepts that are further described in the detailed description. This summary is not intended to identify key or essential features of the claimed subject matter, nor is it intended to be used as an aid for limiting the scope of the claimed subject matter.

BRIEF DESCRIPTION OF DRAWINGS

So that the recited features may be understood in detail, a more particular description may be had by reference to one or more embodiments, some of which are illustrated in the appended drawings. It is to be noted, however, that the appended drawings are illustrative embodiments, and are, therefore, not to be considered limiting of its scope. Accordingly, while the drawings may be considered as being drawn to scale for some embodiments of the present disclosure, such scale is not limiting of the present disclosure as the drawings are not drawn to scale for each embodiment of the present disclosure.

DETAILED DESCRIPTION

As generally disclosed in the figures, a cutting element (e.g., cutting elements 100, 200, 300, 600, and 700 of FIGS. 1-8) is disclosed in accordance with various embodiments of the present disclosure. The cutting elements may be used for a variety of cutting operations. Such operations in which the cutting elements may be used include, but are not limited to, drilling a wellbore within a rock formation, cutting/milling a window through casing of a wellbore, drilling formation or cement after forming a window to initiate drilling of a lateral borehole, section milling a portion of casing within a wellbore, other operations, or some combination thereof. When used in a wellbore, the cutting elements may be used in connection with a downhole tool (e.g., downhole tools 400, 500, and 800 of FIGS. 4, 5, and 8). Of course, other downhole or other tools are contemplated and may be coupled to, or carry, a cutting insert according to embodiments of the present disclosure.

Figure 1:
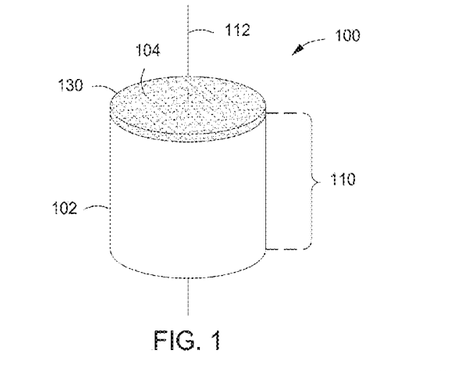
FIG. 1 is a perspective view of an illustrative cutting insert, according to one or more embodiments of the present disclosure.

Cutting elements of the present disclosure may be at least partially made from a composite material (e.g., composite material 110 of FIG. 1). In some embodiments, the composite material may include a carbide material, a binder material, a plurality of diamond particles, other materials, or any combination of the foregoing. In a particular, non-limiting example, carbide material may make up between 55 wt % and 97 wt % of a total weight of the composite material. The binder material may make up from 3 wt % to 20 wt % of the total weight of the composite material, while the plurality of diamond particles may make up from 0.1 wt % to 25 wt % of the total weight of the composite material. In some embodiments, the carbide material and the binder material may be combined and sintered together prior to being combined with the plurality of diamond particles. Combining the carbide and binder materials with the plurality of diamond particles may also be done with or without using a small or other amount of premixed metal binder or other material. The combined carbide and binder materials may form a plurality of pellets (e.g., pellets 910 of FIG. 9). In accordance with at least some embodiments of the present disclosure, the pellets may have an average cross-sectional length from 10 μm to 250 μm. According to at least some embodiments, the pellets may make up between 75 wt % and 99.9 wt % of the total weight of the composite material. In at least some embodiments, the pellets may be formed of materials in addition to the carbide and binder materials. For instance diamond particles may be sintered with the carbide and binder materials to form pellets. According to some embodiments, when the pellets include diamond, the size of the pellets may be between 10 μm and 500 μm.

FIG. 1 is a perspective view of an illustrative cutting element or cutting insert 100, according to one or more embodiments. In at least some embodiments, the cutting insert 100 may be substantially cylindrical, and may have an outer side surface 102 and an outer end surface 104. As shown, the outer end surface 104 may be substantially flat; however, as discussed in greater detail herein, the outer end surface 104 may also be curved, angled, contoured, or otherwise shaped or configured. While shown alone, it should also be appreciated that the cutting insert 100 can be used in connection with one or more other cutting inserts, and located on or in a mill, bit, reamer, or other cutting tool. For instance, the cutting insert 100 may be coupled to, or integral with, a directional mill, a window mill, a section mill, a reamer, a hole opener, a roller cone drill bit, an impregnated drill bit, a fixed cutter (e.g., polycrystalline diamond compact or PDC) drill bit, or other downhole tool for cutting/milling a casing or drilling into a rock formation. In some embodiments, a window mill may be a mill configured to mill a window in casing made of steel or other materials. Similarly, a section mill may be a mill configured to mill out a section of casing made of steel or other materials. In contrast to a mill which may mill casing or other materials within a wellbore, a drill bit may be used for formation drilling.

The cutting insert 100 may be at least partially made from a composite material 110, which may include one or more carbide materials, one or more binder materials, a plurality of diamond particles, other materials, or any combination of the foregoing. The carbide material may be or include tungsten carbide ("WC"), titanium carbide ("TiC"), niobium carbide ("NbC"), tantalum carbide ("TaC"), other carbides, or any combination of the foregoing.

The carbide material content in the composite material 110 may, in some embodiments, be within a range of 30 wt % to 99 wt % of the total weight of the composite material 110. More particularly, the carbide material content may be within a range that includes lower and/or upper limits that include any of 30 wt %, 40 wt %, 50 wt %, 60 wt %, 70 wt %, 80 wt %, 85 wt %, 90 wt %, 95 wt %, 97 wt %, 99 wt %, or values therebetween. For example, the carbide material content may be from 40 wt % to 99 wt %, from 55 wt % to 97 wt %, or from 60 wt % to 85 wt % of the total weight of the composite material 110. In other embodiments, the carbide material content may be from 40 wt % to 50 wt %, from 50 wt % to 60 wt %, from 60 wt % to 70 wt %, from 70 wt % to 80 wt %, from 70 wt % to 75 wt %, from 75 wt % to 80 wt %, from 80 wt % to 90 wt %, from 80 wt % to 85 wt %, from 85 wt % to 90 wt %, from 90 wt % to 99 wt %, from 90 wt % to 95 wt %, or from 95 wt % to 99 wt %. In other embodiments, the carbide material content may be less than 30 wt % or more than 99 wt % of the total weight of the composite material 110.

In some embodiments, carbide material may initially be in powder form. When in the powder form, the carbide material may have a particle size or average cross-sectional length that is between 0.1 μm and 10 μm. For instance, the particle size may be within a range that includes lower and/or upper limits that include any of 0.1 μm, 0.5 μm, 1 μm, 1.5 μm, 2 μm, 3 μm, 4 μm, 5 μm, 7.5 μm, 10 μm, or values therebetween. For example, the particle size may be from 0.1 μm to 10 μm, from 0.5 μm to 5 μm, or from 1 μm to 3 μm. In another embodiment, the particle size may be from 0.1 μm to 0.5 μm, from 0.5 μm to 1 μm, from 1 μm to 3 μm, from 3 μm to 5 μm, or from 5 μm to 7.5 μm. In other embodiments, the particle size may be less than 0.1 μm or larger than 10 μm.

While the carbide material may include particles in a powder form having a particular average cross-sectional length or other particle size, in some embodiments, there may be multiple size distributions of particles. In at least some embodiments, at least some of the distributions may be within a range between 0.1 μm and 10 μm. For instance, there may be two size distributions and 20% of the carbide materials, by weight, may have a particle size between 0.5 μm and 2 μm, while 80% of the carbide materials, by weight, may have a particle size between 4 μm and 6 μm. These percentages and ranges are, however, illustrative. There may, for instance, be more than two discrete size distributions, and the amount of the particles within any particular size distribution may vary (e.g., between 0.1% and 99%).

As noted herein, the composite material 110 may also include one or more binder materials. Examples of the one or more binder materials of the composite material 110 may include cobalt ("Co"), nickel ("Ni"), iron ("Fe"), or other metals or other materials, combinations thereof, and the like. The binder material content in the composite material 110 may, in some embodiments, be within a range that includes lower and/or upper limits that include any of 1 wt %, 2 wt %, 3 wt %, 4 wt %, 5 wt %, 10 wt %, 15 wt %, 20 wt %, 25 wt %, 30 wt %, or values therebetween, relative to the total weight of the composite material 110. For example, the binder material content may be from 1 wt % to 30 wt %, from 3 wt % to 20 wt %, or from 5 wt % to 15 wt % of the total weight of the composite material 110. In another embodiment, the binder material content may be from 1 wt % to 5 wt %, from 5 wt % to 10 wt %, from 10 wt % to 15 wt %, from 15 wt % to 20 wt %, or from 20 wt % to 25 wt % of the total weight of the composite material 110.

The composite material 110 may also include a plurality of diamond particles in some embodiments. The amount of the diamond particles in the composite material 110 may vary, and in some embodiments may be within a range of 0.1 wt % to 30 wt % of the total weight of the composite material 110. For instance, the amount of the diamond particles may be within a range that includes lower and/or upper limits that include any of 0.1 wt %, 0.5 wt %, 1 wt %, 3 wt %, 5 wt %, 10 wt %, 15 wt %, 20 wt %, 25 wt %, 30 wt %, or any values therebetween. For example, the diamond content may be from 0.1 wt % to 30 wt %, from 1 wt % to 25 wt %, from 5 wt % to 20 wt %, or from 8 wt % to 17 wt % of the total weight of the composite material 110. In another embodiment, the diamond particles may account for 0.1 wt % to 5 wt %, 5 wt % to 10 wt %, 10 wt % to 15 wt %, 15 wt % to 20 wt %, 20 wt % to 25 wt %, or 25 wt % to 30 wt % of the total weight of the composite material 110. In some embodiments, the diamond particles may account for less than 0.1 wt % or more than 30 wt % of the composite material 110. In at least one embodiment, a plurality of cubic boron nitride ("CBN") particles may be used in place of, or in combination with, the diamond particles as disclosed herein. The addition of the diamond particles and/or cubic boron nitride particles may increase the wear resistance and improve the micro-chipping resistance of the cutting insert 100.

The particle size or average cross-sectional length of the diamond particles and/or cubic boron nitride particles may vary, and in some embodiments may range from 0.5 μm to 40 μm. For instance, the particle size of the diamond particles and/or cubic boron nitride particles may be within a range that includes lower and/or upper limits including any of 0.5 μm, 1 μm, 2 μm, 5 μm, 10 μm, 15 μm, 20 μm, 25 μm, 30 μm, 35 μm, 40 μm, or any values therebetween. For example, the particle size may be from 1 μm to 40 μm, from 2 μm to 30 μm, or from 5 μm to 20 μm. In another embodiment, the particle size may be from 1 μm to 5 μm, from 5 μm to 10 μm, from 10 μm to 15 μm, from 15 μm to 20 μm, or from 25 μm to 30 μm. In still another embodiment, the particle size may be less than 0.5 μm or greater than 40 μm.

While the diamond particles and/or cubic boron nitride particles may include particles having a particular average cross-sectional length or other particle size, in some embodiments, there may be multiple size distributions of particles. In at least some embodiments, at least some of the distributions may be within a range between 0.5 μm and 40 μm. For instance, there may be three size distributions and 40% of the diamond particles, by weight, may have a particle size between 0.5 μm and 5 μm, 40% of the diamond particles, by weight, may have a particle size between 10 μm and 20 μm, and 20% of the diamond particles, by weight, may have a particle size between 25 μm and 40 μm. These percentages and ranges are, however, illustrative. There may, for instance, be less than two discrete size distributions or more than three discrete size distributions, and the amount of the particles within any particular size distribution may vary (e.g., between 0.1% and 99%).

In accordance with some embodiments, including the embodiment shown in FIG. 1, a coating 130 may be positioned on or over at least a portion of the outer surface (e.g., outer side surface 102 and/or outer end surface 104) of the composite material 110 or other portion of the cutting insert 100. The coating 130 may reduce the friction between the cutting insert 100 and a workpiece, such as a casing. In the same or other embodiments, the coating 130 may seal any surface defects in the cutting insert 100, which may increase the cutting efficiency of the cutting insert 100.

The coating 130 may be applied in any suitable manner, including through physical vapor deposition, chemical vapor deposition, thermal spraying, ion plating, other techniques, or using combinations of the foregoing. The coating 130 may be placed on the outer side surface 102 of the cutting insert 100, the outer end surface 104 of the cutting insert 100, or both. In some embodiments, the coating 130 may be or include titanium nitride ("TiN"), chromium nitride ("CrN"), titanium aluminum nitride ("TiAlN"), titanium carbide ("TiC"), titanium carbonitride ("TiCN"), silicon carbide ("SiC"), aluminum oxide ("$Al_2O_3$"), other metals, alloys or materials, or any combination of the foregoing. The coating 130 may, in some embodiments, have a thickness between 0.5 μm and 30 μm. For instance, the thickness of the coating 130 may be within a range including lower and/or upper limits including any of 0.5 μm, 1 μm, 2 μm, 3 μm, 4 μm, 5 μm, 6 μm, 8 μm, 10 μm, 15 μm, 20 μm, or values therebetween. For example, the thickness may be from 1 μm to 15 μm, from 3 μm to 10 μm, or from 4 μm to 8 μm. In another embodiment, the thickness may be from 1 μm to 3 μm, from 3 μm to 5 μm, from 5 μm to 7.5 μm, from 7.5 μm to 10 μm, or from 10 μm to 15 μm. In still other embodiments, the thickness of the coating 130 may be less than 0.5 μm or more than 20 μm.

Figure 2:
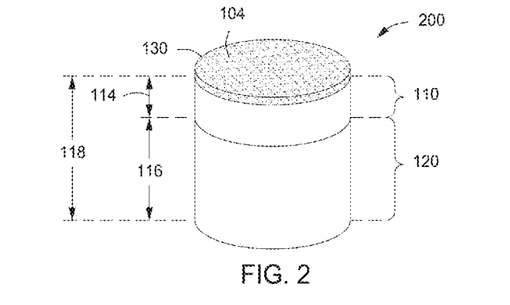
FIG. 2 is a perspective view of another illustrative cutting insert including a carbide substrate material, according to one or more embodiments of the present disclosure.

FIG. 2 is a perspective view of another illustrative cutting insert 200 according to one or more embodiments of the present disclosure. The cutting insert 200 may include a composite material 110 such as that described above (i.e., including a carbide material, binder material, and a plurality of diamond particles) and a substrate material 120. The composite material 110 may be a first or "upper" layer that is sintered onto, or otherwise coupled to, a second or "lower" layer of the substrate material 120.

The substrate material 120 may be or include a variety of materials, including carbide and/or a binder (e.g., a metal binder). When the substrate material 120 includes carbide, the carbide may include tungsten carbide ("WC"), titanium carbide ("TiC"), niobium carbide ("NbC"), tantalum carbide ("TaC"), or other carbides, any combination of the foregoing, and the like. An included binder may be the same as the binder described above (e.g., any combination of Co, Ni, or Fe), or may have other properties. The binder of the substrate 120 may therefore be the same or different than a binder of the composite material 110. The particle size of the components of the substrate material 120 may be substantially the same as the particle size of the components of the carbide material, or the particle size of the components of the substrate material 120 may be different.

The height and/or thickness of the respective composite material 110 and substrate 120 may vary. An illustrative ratio of a height/thickness 114 of the composite material 110 to a height/thickness 116 of the substrate material 120 may be from 1:1 to 1:50. In some embodiments, the ratio of height/thickness 114 of the composite material 110 to the height/thickness 116 of the substrate material 120 may be from 1:1 to 1:2, from 1:2 to 1:3, from 1:3 to 1:5, from 1:5 to 1:10, from 1:10 to 1:20, or from 1:20 to 1:50. A ratio of the height/thickness 114 of the composite material 110 to a height/thickness 118 of the cutting insert 200 may be from 1:1 to 1:50, or more particularly from 1:1 to 1:2, from 1:2 to 1:3, from 1:3 to 1:5, from 1:5 to 1:10, from 1:10 to 1:20, or from 1:20 to 1:50. As an illustrative example, the ratio of the height/thickness 114 of the composite material 110 to the height/thickness 118 of the cutting insert 200 may be 0.15:1 or 1:6.67. In other embodiments, the ratio of the height/thickness 114 of the composite material 110 to a height/thickness 116 of the substrate material 120 or the cutting insert 200 may be more than 1:1 or less than 1:50.

Figure 3:
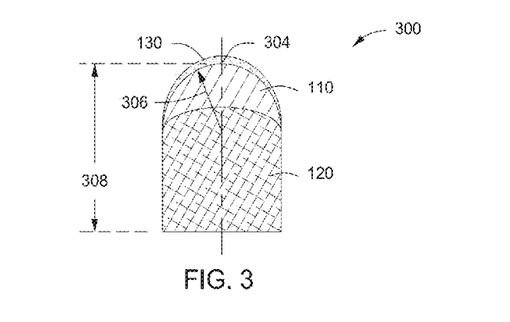
FIG. 3 is a cross-sectional view of another illustrative cutting insert with a curved outer end surface, according to one or more embodiments of the present disclosure.

FIG. 3 is a cross-sectional side view of another illustrative cutting insert 300 according to some embodiments of the present disclosure. As shown, the cutting insert 300 may include a curved outer end surface 304, according to one or more embodiments of the present disclosure. In some embodiments, the cutting insert 300 of FIG. 3 may include the composite material 110 and the substrate material 120, as described above with reference to FIG. 2. In other embodiments, the cutting insert 300 may include the composite material 110 without the substrate material 120, similar to the embodiment in FIG. 1. The composite material 110 of FIG. 300 may also be different than the composite material 110 of FIG. 1 and/or FIG. 2.

While the outer end surfaces 104 of the cutting inserts 100, 200 in FIGS. 1 and 2 may be substantially flat or planar, the outer end surface 304 of the cutting insert 300 in FIG. 3 may optionally be contoured, curved, angled, or otherwise shaped. The particular embodiment shown in FIG. 3 may be referred to as a semi-round top ("SRT") cutting insert; however, the shape of the cutting insert 300 may vary, and may have a conical top, a frustoconical top, a chisel top, a saddle top, or any other shape at the top of the cutting insert. In some embodiments, the outer end surface 304 of FIG. 3 may have a radius of curvature 306 ranging from 3 mm to 20 mm. For instance, the radius of curvature 306 may be within a range including lower and/or upper limits that include any of 3 mm, 4 mm, 5 mm, 6 mm, 7 mm, 8 mm, 10 mm, 15 mm, 20 mm, or values therebetween. In some embodiments, the radius of curvature 306 may therefore range from 3 mm to 20 mm, from 4 mm to 15 mm, from 3 mm to 4 mm, from 4 mm to 5 mm, from 6 mm to 7 mm, from 8 mm to 10 mm, or from 15 mm to 20 mm. In other embodiments, the radius of curvature 306 may be less than 3 mm or more than 20 mm.

A ratio of the radius of curvature 306 to a height 308 of the cutting insert 300 may also vary, and in some embodiments may range from 1:1 to 1:10. For instance, the ratio of the radius of curvature 306 to a height 308 of the cutting insert 300 may vary from 1:1 to 1:2, from 1:2 to 1:3, from 1:3 to 1:4, from 1:4 to 1:5, or from 1:5 to 1:10. In other embodiments, the ratio of the radius of curvature 306 to a height 308 of the cutting insert 300 may be less than 1:1 or more than 1:10. In at least one embodiment, the outer end surface 304 may be conical, frustoconical, chisel-shaped, or saddle-shaped.

Figure 4:
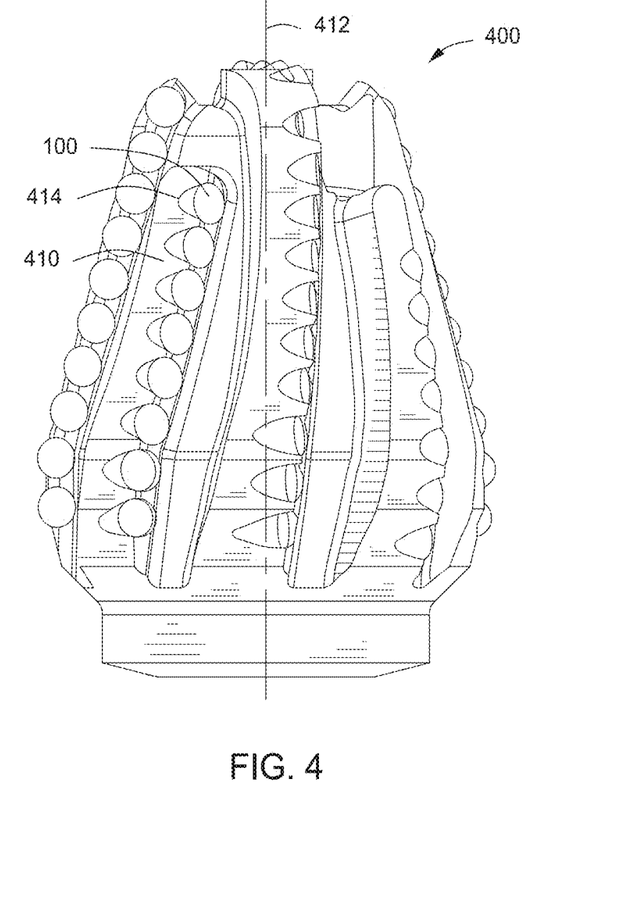
FIG. 4 is a side view of an illustrative downhole tool having a plurality of cutting inserts coupled thereto, according to one or more embodiments of the present disclosure.

FIG. 4 is a side view of an illustrative cutting tool 400 having a plurality of cutting inserts 100 coupled thereto, according to one or more embodiments. As shown, the cutting tool 400 may include a mill. An example mill may include a window mill, lead mill, or taper mill for use in milling casing during a sidetracking operation. The particular configuration of the cutting tool 400 may, however, vary and the cutting inserts 100 may be coupled to any number of different types of tools. For instance, the cutting inserts 100 may instead (or additionally) be connected to any type of mill, drill bit, reamer, cutter, intervention tool, exploratory tool, or other tool. Moreover, the cutting tool 400, and the cutting inserts 100, may be used in a wide variety of industries such as, but not limited to, oil and gas exploration and production, water exploration and production, underground/subsea utility placement, or the like.

With continued reference to FIG. 4, the cutting tool 400 may include one or more blades 410 extending radially therefrom. The blades 410 may be circumferentially offset from one another with respect to a central longitudinal axis 412 through the cutting tool 400. Optionally, each blade 410 may include a one or more pockets 414 formed therein. In the illustrated embodiment, each blade 410 may include a plurality of pockets 414 axially offset from one another with respect to the central longitudinal axis 412 through the cutting tool 400.

The cutting inserts 100 may be coupled to the cutting tool 400 by being positioned within the pockets 414 and secured therein via a welding, brazing, mechanical fastening, or other suitable process. The cutting inserts 100 may be oriented such that a central longitudinal axis 112 (see FIG. 1) extending therethrough is about parallel to a line that is tangential to an outer surface of the cutting tool 400. Although the cutting inserts 100 are shown in FIG. 4, it should be appreciated by a person having ordinary skill in the art in view of the disclosure herein that other cutting inserts disclosed herein (e.g., cutting inserts 200, 300, 600, 700, or any combination thereof) may be used with the cutting tool 400.

Figure 5:
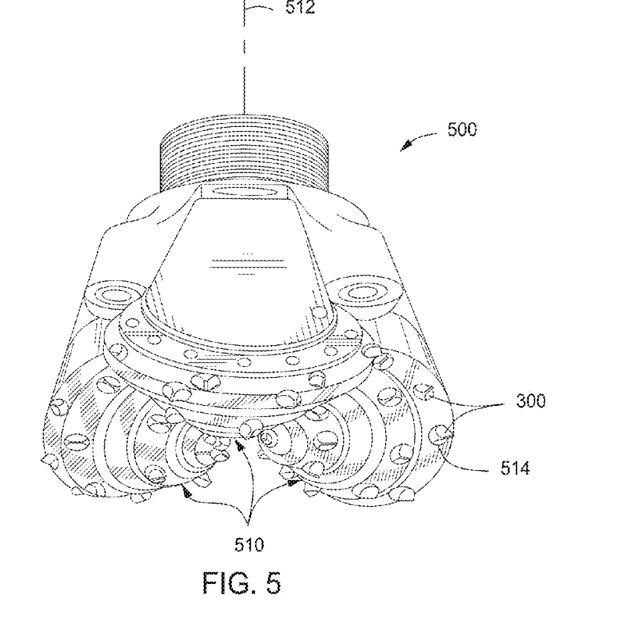
FIG. 5 is a side view of another illustrative downhole tool having a plurality of cutting inserts coupled thereto, according to one or more embodiments of the present disclosure.

FIG. 5 is a side view of another illustrative cutting tool 500 having a plurality of cutting inserts 300 coupled thereto, according to one or more embodiments. As shown, the cutting tool 500 may include a downhole, roller cone drill bit, although as described herein, the cutting tool 500 may have any number of other forms.

The cutting tool 500, as shown, may be configured to drill a wellbore though a subterranean formation (e.g., a rock formation). The cutting tool 500 may include one or more cutters 510 configured to roll along the surface of the subterranean formation during drilling operations. As shown, the downhole tool 500 includes cutters 510 that are circumferentially offset from one another with respect to a central longitudinal axis 512 through the cutting tool 500, and which are optionally of a substantially conical shape. Each conical cutter 510 may include one or more pockets 514 formed therein. The cutting inserts 300 may be positioned within the plurality of pockets 514 of FIG. 5 and coupled therein via a press fit, brazing, or other suitable process. The cutting inserts 300 may be semi-round top ("SRT") inserts, conical top inserts, frustoconical top inserts, chisel top inserts, saddle top inserts, or the like.

Figure 6:
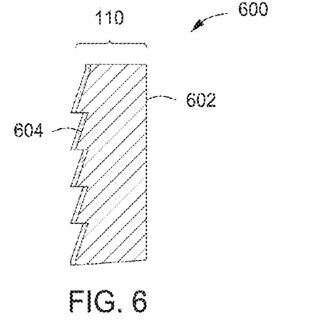
FIG. 6 is a perspective view of yet another illustrative cutting insert, according to one or more embodiments of the present disclosure.

FIG. 6 is a cross-sectional view of yet another illustrative cutting insert 600, according to one or more embodiments of the present disclosure. As shown, the cutting insert 600 may have opposing inner and outer surfaces 602, 604. In some embodiments, the inner surface 602 may be substantially flat or planar. In the same or other embodiments, the outer surface 604 may be a serrated, textured, ridged, or otherwise configured. The cutting insert 600 may be made at least partially from a composite material (e.g., composite material 110 including a carbide material, binder material, and plurality of diamond particles as described herein).

Figure 7:
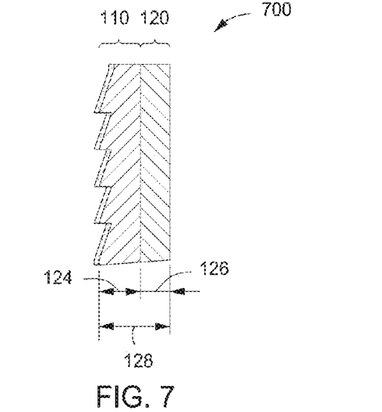
FIG. 7 is a perspective view of still another illustrative cutting insert including a carbide substrate material, according to one or more embodiments of the present disclosure.

FIG. 7 is a perspective view of yet another illustrative cutting insert 700. In the illustrated embodiment, the cutting insert 700 includes an optional substrate material 120, according to one or more embodiments. The cutting insert 700 of FIG. 7 may be similar to the cutting insert 600 of FIG. 6; however, the cutting insert 700 of FIG. 7 may also include the substrate material 120. The composite material 110 may be a first or "outer" layer that is sintered or otherwise adhered, bonded, or otherwise coupled to a second or "inner" layer of the substrate material 120. The substrate material 120 may be similar to the substrate material 120 described above with reference to FIG. 2, and may include a carbide material in some embodiments.

A ratio of a height/thickness 124 of the composite material 110 to a height/thickness 126 of the substrate material 120 may be from 5:1 to 1:50 in some embodiments. In more particular embodiments, for instance, the ratio of a height/thickness 124 of the composite material 110 to a height/thickness 126 of the substrate material 120 may be from 5:1 to 3:1, from 3:1 to 2:1, from 2:1 to 1:1, from 1:1 to 1:2, from 1:2 to 1:3, from 1:3 to 1:5, from 1:5 to 1:10, or from 1:10 to 1:50. The ratio of the height/thickness 124 of the composite material 110 to the height/thickness 126 of the substrate material 120 may be greater than 5:1 or less than 1:50 in other embodiments.

A ratio of the height/thickness 124 of the composite material 110 to a height/thickness 128 of the cutting insert 700 may also vary. In some embodiments, for instance, the ratio may be from 1:1 to 1:50. For instance, a ratio of the height/thickness 124 of the composite material 110 to a height/thickness 128 of the cutting insert 700 may be from 1:1 to 1:1.5, from 1:1.5 to 1:2, from 1:2 to 1:3, from 1:3 to 1:5, from 1:5 to 1:10, from 1:10 to 1:20, or from 1:20 to 1:50. In other embodiments, the ratio of the height/thickness 124 of the composite material 110 to the height/thickness 128 of the cutting insert 700 may be less than 1:50.

Figure 8:
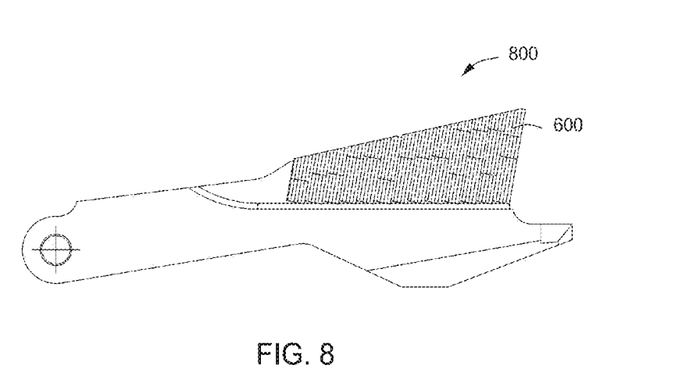
FIG. 8 is a side view of an illustrative downhole tool having a plurality of cutting inserts coupled thereto, according to one or more embodiments of the present disclosure.

FIG. 8 is a top view of an illustrative blade 800 that may be used in a cutting tool (e.g., a downhole tool for a section mill to cut casing) according to one or more embodiments. The blade 800 may include a plurality of the cutting inserts 600 coupled thereto or integral therewith. For example, the cutting inserts 600 may be welded, brazed, or otherwise coupled to the blade 800. Although the inserts 600 are shown, it may be appreciated that the inserts 100, 200, 300, 600, 700, or any combination thereof, may be used with the blade 800.

Referring to FIGS. 1-8, in operation, carbide materials, binder materials, diamond particles, or any combination of the foregoing, may initially be in a powder form having the particle sizes described above. In at least one embodiment, the carbide material, the binder material, and the diamond particles (each in powder form) may be mixed together in suitable proportions, including the proportions described herein. The mixed powders may then be sintered to form the composite material. For example, the mixed powders and substrate may be assembled with a pre-shaped can or mold and sintered therein such that the composite material 110 is in the shape of the cutting insert 100, 200, 300, 600, 700 (or relevant portion thereof) shown in, or described with reference to, any one of FIGS. 1-8.

The temperature of a suitable sintering process may range from 1200° C. to 1700° C. in some embodiments. For instance, the temperature of the sintering process may be within a range including lower and/or upper limits that include any of 1200° C., 1250° C., 1300° C., 1350° C., 1400° C., 1500° C., 1550° C., 1600° C., 1650° C., 1700° C., or temperatures therebetween. For example, the sintering temperature may be from 1300° C. to 1600° C. or from 1400° C. to 1500° C. In other embodiments, the temperature may be less than 1200° C. or more than 1700° C. The pressure of a suitable sintering process may also vary, and in some embodiments may range from 3000 MPa to 8000 MPa. More particularly, the pressure of the sintering process may be within a range including lower and/or upper limits including any of 3000 MPa, 3500 MPa, 4000 MPa, 4500 MPa, 5000 MPa, 6000 MPa, 6500 MPa, 7000 MPa, 7500 MPa, 8000 MPa, or values therebetween. For example, the pressure may be between 3000 MPa and 7000 MPa, between 4000 MPa and 6000 MPa, or between 4500 MPa and 5500 MPa. In other embodiments, the pressure of the sintering process may be less than 3000 MPa or more than 8000 MPa.

The composite material 110 may be on and/or coupled to a substrate material 120, as shown in FIGS. 2, 3, and 7. More particularly, the composite material 110 may be sintered or otherwise coupled to the substrate material 120 to form the cutting inserts 200, 300, 700. In other embodiments, however, the substrate material 120 may be omitted, as shown in FIGS. 1 and 6.

Figure 9:
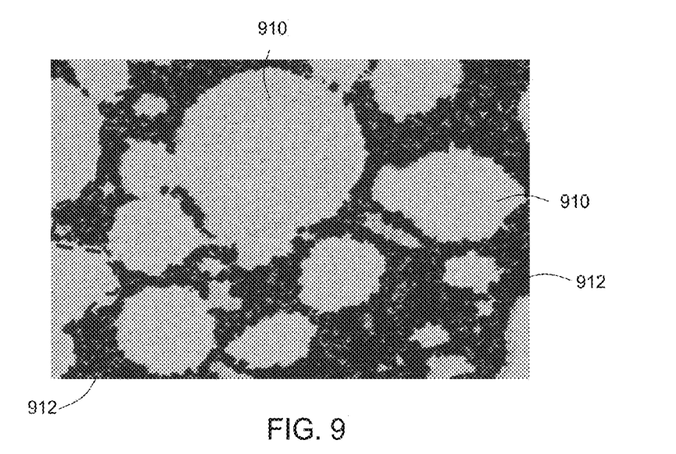
FIG. 9 is a photograph of a composite material taken with a scanning electron microscope, according to one or more embodiments of the present disclosure.

FIG. 9 is a photograph of an example of a composite material as disclosed herein (e.g., composite material 110 of FIG. 1-3, 6, or 7), as taken with a scanning electron microscope, according to one or more embodiments. In at least one embodiment, a carbide material and a binder material may be mixed together prior to the addition of the diamond particles. The carbide material and the binder material may be sintered to form a plurality of pellets 910. The pellets 910 may have a substantially spherical shape, an angled shape, or any other suitable shape. The pellets 910 may have a particle size or average cross-sectional length ranging from 10 µm to 300 µm in some embodiments. For instance, the pellets 910 may have a particle size or average cross-sectional length within a range with lower and/or upper limits including any 10 µm, 20 µm, 30 µm, 40 µm, 50 µm, 75 µm, 100 µm, 150 µm, 200 µm, 250 µm, 300 µm, or values therebetween. For example, the size of the pellets 910 may be from 10 µm to 250 µm, from 20 µm to 200 µm, from 50 µm to 180 µm, or from 75 µm to 150 µm. In another embodiment, the size of the pellets 910 may be from 10 µm to 50 µm, from 30 µm to 70 µm, from 50 µm to 90 µm, from 70 µm to 110 µm, from 90 µm to 130 µm, from 110 µm to 150 µm, from 130 µm to 170 µm, from 150 µm to 190 µm, or from 170 µm to 210 µm. In still other embodiments, the size of the pellets 910 may be less than 10 µm or more than 300 µm.

The pellets 910, the plurality of diamond particles, and optionally a binder (e.g., metal binder) may be mixed together and sintered to form the composite material. For example, the pellets 910, the diamond particles, and a pre-mixed cobalt powder may be assembled (e.g., in the proportions described herein) with the substrate into a can or a mold and sintered therein such that the composite material is in the shape of a desired cutting insert 100, 200, 300, 600, 700 (or relevant portion thereof) shown in any one of FIGS. 1-8. The binder material may be the same material as the binder material used to form the pellets 910 (e.g., cobalt), or may be different.

Once the pellets 910 and the plurality of diamond particles are sintered together, the plurality of diamond particles may form a diamond network 912. The pellets 910 may be located or dispersed in the diamond network 912. At least one of the pellets 910 may be surrounded by the diamond network 912 such that the pellet 910 is not in contact with another pellet 910.

A hardness of the composite material may range from HV900 to HV4000 in some embodiments. For instance, the hardness of the composite material 110 may be within range including lower and/or upper limits including any of HV900, HV1070, HV1400, HV1700, HV1900, HV2140, HV2700, HV3300, HV4000, or values therebetween. For example, the hardness of the composite material may be from HV1250 to HV4000, from HV1550 to HV3600, or from HV1700 to HV3100. In other embodiments, the hardness of the composite material may be less than HV900 or more than HV4000.

The microstructure of the composite material shown in FIG. 9 may provide a cutting insert (e.g., cutting insert 100, 200, 300, 600, 700 of FIGS. 1-8) having a high compressive strength, a high wear resistance, an increased toughness, other mechanical properties, or some combination of the foregoing. In addition, a cutting insert including the composite material shown in FIG. 9 may form self-sharpening edges. For instance, in a steel casing cutting/milling application, the diamond network 912 may chip and/or wear down before the pellets 910, as the diamond network 912 reacts with the steel and/or graphitizes. This may cause the pellets 910 to be exposed with sharp edges, which may enhance cutting efficiency.

In the description herein, various relational terms are provided to facilitate an understanding of various aspects of some embodiments of the present disclosure. Relational terms such as "bottom," "below," "top," "above," "back," "front," "left," "right," "rear," "forward," "up," "down," "horizontal," "vertical," "clockwise," "counterclockwise," "upper," "lower," "uphole," "downhole," and the like, may be used to describe various components, including their operation and/or illustrated position relative to one or more other components. Relational terms do not indicate a particular orientation for each embodiment within the scope of the description or claims. For example, a component of a cutting tool, cutting insert, or bottomhole assembly that is described as "below" another component may be further from the surface while within a vertical wellbore or when oriented on a mill or other bit, but may have a different orientation during assembly, when removed from the wellbore or bit, or in a lateral borehole. Accordingly, relational descriptions are intended solely for convenience in facilitating reference to various components, but such relational aspects may be reversed, flipped, rotated, moved in space, placed in a diagonal orientation or position, placed horizontally or vertically, or similarly modified. Certain descriptions or designations of components as "first," "second," "third," and the like may also be used to differentiate between identical components or between components which are similar in use, structure, or operation. Such language is not intended to limit a component to a singular designation. As such, a component referenced in the specification as the "first" component may be the same or different than a component that is referenced in the claims as a "first" component.

Furthermore, while the description or claims may refer to "an additional" or "other" element, feature, aspect, component, or the like, it does not preclude there being a single element, or more than one, of the additional or other element. Where the claims or description refer to "a" or "an" element, such reference is not be construed that there is just one of that element, but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in some embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, or machined from the same one or more pieces of material stock. Components that are "integral" should also be understood to be "coupled" together.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in any combination. Processes and components of a method may be performed in any order.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including so-called functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

While embodiments disclosed herein may be used in oil, gas, or other hydrocarbon exploration or production environments, such environments are merely illustrative. Systems, tools, assemblies, methods, cutting tools, cutting inserts, mills, drill bits, composite materials, substrates, and other components of the present disclosure, or which would be appreciated in view of the disclosure herein, may be used in other applications and environments. In other embodiments, milling tools, cutting inserts, or other embodiments discussed herein, or which would be appreciated in view of the disclosure herein, may be used outside of a downhole environment, including in connection with other systems, including within automotive, aquatic, aerospace, hydroelectric, manufacturing, medical, other industries, or even in other downhole environments. The terms "well," "wellbore," "borehole," and the like are therefore also not intended to limit embodiments of the present disclosure to a particular industry. A wellbore or borehole may, for instance, be used for oil and gas production and exploration, water production and exploration, mining, utility line placement, or myriad other applications.

Certain embodiments and features may have been described using a set of numerical values that may provide lower and upper limits. It should be appreciated that ranges including the combination of any two values, an upper limit of a value, or a lower limit of a value are contemplated unless otherwise indicated, and that a particular value may be defined by a range having the same lower and upper limit.

Numbers, percentages, ratios, measurements, or other values stated in the description and claims include the stated value as well as other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least experimental error and variations that would be expected by a person having ordinary skill in the art, as well as the variation to be expected in a suitable manufacturing or production process. A value that is about or approximately the stated value and is therefore encompassed by the stated value may further include values that are within 10%, within 5%, within 1%, within 0.1%, or within 0.01% of a stated value.

Embodiments are shown in the identified drawings. The drawings are to scale for some embodiments of the present disclosure, but are not to scale for other embodiments contemplated as within the scope of the present disclosure. The drawing should be usable to identify relative sizes and positioning of some embodiments, but such sizes and positioning may be exaggerated, understated, or schematic for other embodiments contemplated herein.

The abstract included with this disclosure is provided to allow the reader to quickly ascertain the general nature of some embodiments of the present disclosure. The abstract is submitted with the understanding that it will not be used to interpret or limit the scope or meaning of the claims.

What is claimed is:

1. A cutting element for a cutting tool, comprising:
   a composite material, having:
      a total weight of which 55 wt % to 97 wt % is made up of a carbide material, 3 wt % to 20 wt % is made up of a binder material, and 0.1 wt % to 25 wt % is made up of a plurality of diamond particles; and
      a plurality of pellets formed of the carbide material and the binder material by a sintering process prior to being combined with the plurality of diamond particles, the plurality of pellets having an average cross-sectional length between 10 µm and 250 µm.

2. The cutting element of claim 1, the average cross-sectional length of the pellets being between 20 µm and 180 µm.

3. The cutting element of claim 1, the carbide material including at least one of tungsten carbide, titanium carbide, niobium carbide, or tantalum carbide.

4. The cutting element of claim 1, the carbide material including a plurality of carbide particles having an average cross-sectional length between 0.5 µm and 5 µm.

5. The cutting element of claim 1, the binder material including at least one of cobalt, nickel, or iron.

6. The cutting element of claim 1, the plurality of diamond particles having an average cross-sectional length between 2 µm and 30 µm.

7. The cutting element of claim 1, further comprising:
   a coating on the composite material, the coating including at least one of titanium nitride, chromium nitride, titanium aluminum nitride, titanium carbide, titanium carbonitride, silicon carbide, or aluminum oxide.

8. The cutting element of claim 7, a thickness of the coating being between 3 µm and 10 µm.

9. The cutting element of claim 1, further comprising:
   a substrate material coupled to the composite material, the substrate material including a carbide material and a metal binder, the carbide material including at least one of tungsten carbide, titanium carbide, niobium carbide, or tantalum carbide, and the metal binder including at least one of cobalt, nickel, or iron.

10. The cutting element of claim 1, the cutting element being configured to be coupled to a window mill, a section mill, or a drill bit.

11. A method for making a cutting insert, comprising:
    sintering a carbide material and a binder material together to form a plurality of pellets having an average cross-sectional length from 10 µm to 250 µm; and
    sintering the plurality of pellets, a plurality of diamond particles, and a pre-mixed metal binder together to form a composite material, the carbide material making up from 55 wt % to 97 wt % of the composite material, the binder material making up from 3 wt % to 20 wt % of the composite material, and the plurality of diamond particles making up from 0.1 wt % to 25 wt % of the composite material.

12. The method of claim 11, further comprising:
    sintering the plurality of pellets, the plurality of diamond particles, and the pre-mixed metal binder at a temperature from 1300° C. to 1600° C. and a pressure from 4000 MPa to 6000 MPa.

13. The method of claim 11, further comprising:
    applying a coating to the composite material, the coating having a thickness between 3 µm and 10 µm and including at least one of titanium nitride, chromium nitride, titanium aluminum nitride, titanium carbide, titanium carbonitride, silicon carbide, or aluminum oxide.

14. The method of claim 11, further comprising:
    sintering the composite material to a substrate material, the substrate material including a metal binder and a combination of at least one of tungsten carbide, titanium carbide, niobium carbide, or tantalum carbide.

15. The method of claim 11, further comprising:
    brazing the cutting insert to a blade of window mill or section mill.

16. A cutting element for a cutting tool, comprising:
    a composite material, having:
       a total weight of which 55 wt % to 97 wt % is made up of a carbide material, 3 wt % to 20 wt % is made up of a binder material, and 0.1 wt % to 25 wt % is made up of a plurality of diamond particles; and
       a plurality of pellets formed of the carbide material and the binder material by a sintering process prior to being combined with the plurality of diamond particles, the plurality of pellets having an average cross-sectional length between 10 µm and 250 µm, the plurality of pellets including at least one substantially spherical pellet surrounded by a diamond network that includes the plurality of diamond particles, such that the at least one substantially spherical pellet is not in contact with another one of the plurality of pellets.

17. The cutting element of claim 1, a hardness of the composite material being between HV1200 and HV4000.

18. The cutting element of claim 1, the plurality of pellets being dispersed in a diamond network including the plurality of diamond particles.

* * * * *